US009146783B2

(12) United States Patent
Bali et al.

(10) Patent No.: US 9,146,783 B2
(45) Date of Patent: *Sep. 29, 2015

(54) PROCESSOR SCHEDULING METHOD AND SYSTEM USING DOMAINS

(71) Applicant: NetApp, Inc., Sunnyvale, CA (US)

(72) Inventors: Naveen Bali, Sunnyvale, CA (US); Naresh M. Patel, Sunnyvale, CA (US); Manpreet Singh, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 14/044,583

(22) Filed: Oct. 2, 2013

(65) Prior Publication Data

US 2014/0033221 A1 Jan. 30, 2014

Related U.S. Application Data

(63) Continuation of application No. 12/416,867, filed on Apr. 1, 2009, now Pat. No. 8,578,386.

(51) Int. Cl.
G06F 9/455 (2006.01)
G06F 9/46 (2006.01)
G06F 9/50 (2006.01)
G06F 1/32 (2006.01)
G06F 9/48 (2006.01)

(52) U.S. Cl.
CPC .............. *G06F 9/5027* (2013.01); *G06F 1/329* (2013.01); *G06F 1/3287* (2013.01); *G06F 9/4893* (2013.01); *G06F 2209/5017* (2013.01); *Y02B 60/144* (2013.01)

(58) Field of Classification Search
None
See application file for complete search history.

(56) References Cited

U.S. PATENT DOCUMENTS

2005/0172293 A1 * 8/2005 Petruncola et al. ........... 718/105

OTHER PUBLICATIONS

Li et al.; Dynamic Power-Performance Adaptation of Parallel Computation on Chip Multiprocessors; 2006; IEEE.*

* cited by examiner

*Primary Examiner* — Corey S Faherty
(74) *Attorney, Agent, or Firm* — LeClairRyan, a Professional Corporation

(57) ABSTRACT

Aspects of the present invention concern a method and system for scheduling a request for execution on multiple processors. This scheduler divides processes from the request into a set of domains. Instructions in the same domain are capable of executing the instructions associated with the request in a serial manner on a processor without conflicts. A relative processor utilization for each domain in the set of the domains is based upon a workload corresponding to an execution of the request. If there are processors available then the present invention provisions a subset of available processors to fulfill an aggregate processor utilization. The aggregate processor utilization is created from a combination of the relative processor utilization associated with each domain in the set of domains. If processors are not needed then some processors may be shut down. Shutting down processors in accordance with the schedule saves energy without sacrificing performing.

18 Claims, 4 Drawing Sheets

PROCESSOR SCHEDULING METHOD AND SYSTEM USING DOMAINS

CLAIM OF PRIORITY

The present application claims priority from and is a continuation of U.S. patent application Ser. No. 12/416,867, now U.S. Pat. No. 8,578,386, entitled "PROCESSOR SCHEDULING METHOD AND SYSTEM USING DOMAINS," filed Apr. 1, 2009, the contents of which is incorporated herein in be reference in its entirety.

INTRODUCTION

Possibilities for parallel computing have greatly increased with the availability of multi-processor (MP) systems. MP systems increase processing throughput by executing processes on two or more processors. Depending on the MP system design, these processes may run on several or several hundred processors concurrently.

Managing concurrent execution on MP systems involves safeguarding data from modification by multiple processes. Indeterminate results, deadlocks and data corruption may result if more than one process modifies or, in some cases, even accesses the same dataset. Accordingly, it is important to monitor and manage concurrent execution conditions on MP systems to make sure data is processed properly.

Conventional solutions resolve concurrent execution conditions using different types of locks. Fine-grained locking manages concurrent execution on multiple processors by dividing a task into many smaller pieces of code. Placing locks around these small pieces of code keeps them from being accessed or modified by other processes. Locks and communication between processes can be used to increase the number of processors used in parallel processing. In general, fine-grained locking may work well as long as the overhead associated with coordinating the fine-grained locks on the MP system does not consume substantial resources.

Coarse-grained symmetric multi-processor (CSMP) operates differently from the fine-grained locking approach. Instead of using locks, CSMP divides processes along functional barriers into domains of processes having similar functionality. Functional barriers represent a logical separation of processes into different domains where these processes can be run in parallel on different processors without conflict. Generally, processes executing functions within the same domain avoid conflicts over data and dependencies within a given domain because the processes are run serially and not in parallel on multiple processors.

Unfortunately, there are times that CSMP cannot adequately schedule and use all the available processors. This is not only an inefficient use of the available computing power but also tends to use more energy than necessary.

BRIEF DESCRIPTION OF THE DRAWINGS

The features of the present invention and the manner of attaining them, and the invention itself, will be best understood by reference to the following detailed description of implementations of the invention, taken in conjunction with the accompanying drawings, wherein.

DETAILED DESCRIPTION

Figure 1:
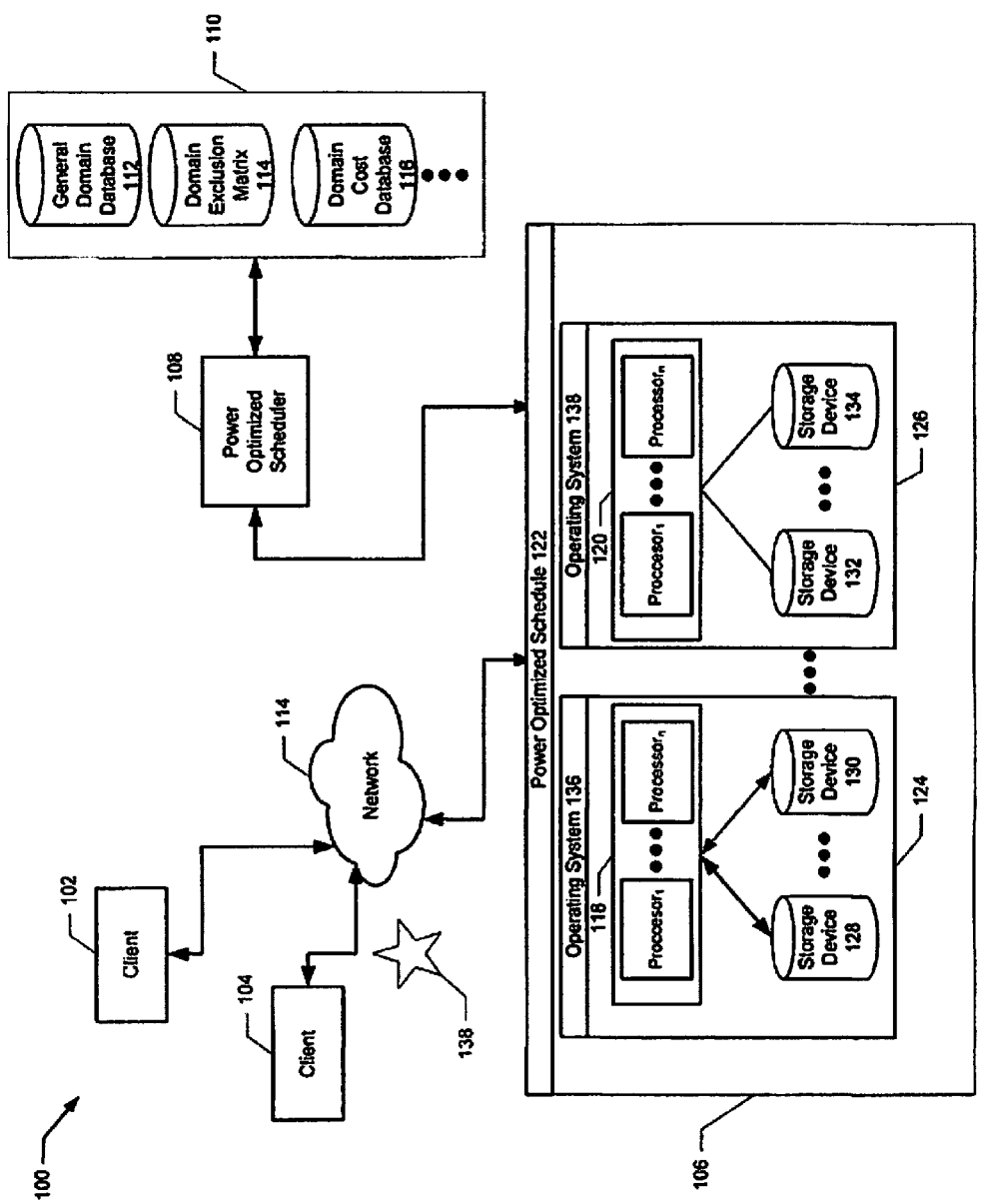
FIG. 1 is a schematic block diagram of an exemplary system providing computer services according to a power optimized schedule generated in accordance with aspects of the present invention.

Aspects of the present invention concern a method and system for scheduling a request for execution on one or more processors. This scheduling method and system divides processes from the request into a set of domains. Instructions from processes in the same domain execute the instructions associated with the request in a serial manner on a processor without conflicts. For each domain, the method and system identifies a relative processor utilization based upon a workload that corresponds to an execution of the request. If there are processors available then the present invention provisions a subset of the available processors to fulfill an aggregate processor utilization. This provisioning of processors fulfills the aggregate processor utilization created from a combination of the relative processor utilization associated with each domain. If some processors are not needed to fulfill the aggregate processor utilization then these processors may be scheduled to be shut down. Shutting down processors saves energy without sacrificing performance as the processing demand has already been met.

Aspects of the present invention provide a method for scheduling one or more processes on a multiple computer processors. Benefits provided by aspects of the present invention include, but are not limited to, one or more of the following mentioned herein below.

In a course-grained symmetric multi-processor (CSMP) system, aspects of the present invention optimize the scheduling of processes across the multiple domains. Processes are separated into domains of functional groups using a predetermined set of functional barriers. These functional barriers create a logical separation between different domains such that processes in one domain may run in parallel with processes from other domains.

In certain cases, processes associated with a selected domain cannot be scheduled to execute in parallel with processes from another domain. A cost function assigns the selected domain a higher "cost" to reflect this added level of scheduling complexity. This higher cost increases a base cost associated with executing processes in the domain. A power optimized scheduler in accordance with the present invention will first schedule processes from the more costly domains and thereafter schedule processes from the lower cost domains. This cost-driven scheduling arrangement allows for an optimal scheduling of tasks from an application in the CSMP environment without the use of locks. Once the schedule is set, the power optimized scheduler may also reduce energy consumption by scheduling execution of the processes in each domain on fewer processors. During this execution time interval, processors not scheduled to execute processes may be scheduled for a shutdown or, alternatively, at least directed to operate at a reduced power level in order to reduce heat and save energy.

Aspects of the present invention reduce energy costs without compromising performance when executing requested tasks. Scheduling done in accordance with aspects of the present invention provides sufficient processing power to adequately perform the task in a given time interval. Tasks are scheduled in advance along with the requisite amount of processing power needed to run. Excess cores or processors not required to execute the task are temporarily shutdown during the given time interval. By carefully anticipating and matching processor demand, aspects of the present invention can meet processing requirements dynamically without sacrificing performance. This approach does not attempt to run processors at slower speeds to save energy (i.e., extend battery life or lower power consumption) if that would result in diminished computing performance characteristics.

FIG. 1 is a schematic block diagram of an exemplary system 100 using a power optimized schedule 122 to schedule execution of processes on one or more processors in accordance with aspects of the present invention. System 100 in FIG. 1 includes clients 102 and 104, storage system 106, a power optimized scheduler 108 and scheduler datasets 110 used in generation of power optimized schedule 122.

In one implementation, exemplary system 100 provides storage services to clients 102 and 104 using storage area network (SAN), network addressable storage (NAS) or other storage technologies processed on multiple processor according to power optimized schedule 122. It is further contemplated that alternate implementations of the present invention may use power optimized schedule 122 to deliver other types of computer services on a multiprocessor (MP) platform. For example, power optimized scheduler 108 and power optimized schedule 122 may be applied to web server technologies using a MP system to deliver web pages and web services to clients 102 and 104 over the Internet. It is also contemplated that many other general purpose applications can implement aspects of the present invention for scheduling and executing processes with reduced energy requirements.

In one implementation, the storage system 106 can be file-level servers such as used in a network-attached storage (NAS) environment, block-level storage servers such as used in a storage area network (SAN) environment, or other storage systems which are capable of providing both file-level and block-level service. Further, although the storage system 106 is illustrated as a single unit in FIG. 1, it can also be implemented in a distributed architecture. For example, each storage server from storage system 106 can be implemented with multiple distributed storage servers. It can also include a physically separate network module (e.g., "N-module") and disk module (e.g., "D-module") (not shown), which communicate with other storage servers over an external interconnect.

In a distributed architecture implementation, the N-module acts as a front-end of the storage server, exporting services to clients; and the D-module acts as the back-end, managing and implementing a parity declustered distribution of a RAID (redundant array of independent disks) organization on the underlying storage of the storage server. The N-module and D-module can be contained in separate housings and communicate with each other via network connections. Thus, the N-module and the D-module enable a storage server to be physically separated into multiple modules that can be distributed across a network. In one implementation, storage system 106 can include multiple N-modules and D-modules, each of the N-modules corresponding to one or more D-modules, and each of the D-modules corresponding to one or more N-modules.

Clients 102 and 104 may be computers or other computer-like devices capable of accessing storage system 106 either directly or indirectly over a network 114. In general, clients 102 and 104 may access storage system 106 over network 114 using wireless or wired connections supporting one or more point-to-point links, shared local area networks (LAN), wide area networks (WAN) or other access technologies. These clients 102 and 104 may be accessing data, applications, raw storage or various combinations thereof stored on storage system 106.

Storage system 106 includes one or more storage servers represented as storage server 124 through storage server 126 and their corresponding storage devices 128 through 130 and storage devices 132 through 134. In this example implementation, storage server 124 and storage server 126 are under the control of operating system 136 and operating system 138 respectively. Each of storage server 124 and storage server 126 may use one or more processors as represented by processors 118 and processors 120 respectively. In one example MP system, processors 118 and processors 120 each have two or more processors. It is contemplated that the processes scheduled on the processors in these MP systems may also include multiple core processor designs in addition to the use of threads in addition to processes.

For example, storage server 124 may use a combination of software and hardware to provide storage services including the organization of information on storage devices 128 through 130, such as disks. Storage server 124 may be responsive to an operating system 136 that includes a file system to logically organize the information as a hierarchical or other structure of directories and files on the disks. Each "on-disk" file may be implemented as a set of disk blocks configured to store information, such as text or raw binary data whereas the directory may be implemented as a specially formatted file in which information about other files and directories is stored. Accordingly, operating system 136 may be a general purpose operating system compatible with single-processor and multiple-processor (MP) configurations and may also include storage operating system functionality used to deliver storage and related services to one or more clients.

As used herein, the term storage operating system generally refers to the computer-executable code operable on a storage system that manages data access and client access requests and may implement file system semantics in certain implementations. The Data ONTAP™ storage operating system, available from Network Appliance, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating within a general-purpose operating system, such as UNIX® or Windows NT®, or as a general-purpose operating system with configurable functionality, which is configured for storage applications as described herein.

In one implementation, storage devices 128 through 130 and storage devices 132 through 134 may be implemented using physical storage disks having one or more storage volumes to define an overall logical arrangement of storage space. Some implementations can serve a large number of storage volumes that may exceed 150 discrete units, for example. A storage volume may be "loaded" in storage server 124 by copying the logical organization of the volume's files, data and directories into memory of storage server 124. Once a volume has been loaded in memory of a storage server, the volume may be "mounted" by one or more users, applications, or devices as long as they are permitted to access its contents and navigate its namespace. As used herein, a volume is said to be "in use" when it is loaded in a server's memory and at least one user or application has mounted the volume and accessed its contents.

As illustrated in FIG. 1, storage servers like storage server 124 may be configured to operate according to a client/server model of information delivery thereby allowing multiple clients, such as client 102 and client 104, to access files simultaneously. In this model, client 102 may be a computer running an application, such as a file-system protocol, that connects to storage server 124 over a network 114 with point-to-point links, shared LAN, WAN, or VPN as implemented over a public network such as the Internet. Communications between storage server 124 and client 102 typically occurs as packets are sent over network 114. Each client may request the services of storage server 124 by issuing storage-system protocol messages formatted in accordance with a conventional storage-system protocol, such as the Common Internet File System (CIFS) or Network File System (NFS) protocol.

In operation, a client 104 makes a request 138 to be fulfilled by one or more storage servers 124 through 126. Client 104 may be a personal computer as well as any computing devices capable of making a request and receiving data for processing. For example, request 138 may be a request to either read data from or write data to storage server 124. Operating system 136 may implement coarse-grained symmetric multiprocessing (CSMP) and scheduling in accordance with power optimized schedule 122 to execute processes associated with request 138 on one or more processors using a reduced amount of power and heat.

To reduce energy consumption and heat, power optimized scheduler 108 attempts scheduling processes on a reduced number of processors. Power optimized scheduler 108 divides processes to be executed under operating system 136 into a set of domains according to their functionality and tasks they perform. General domain database 112 has information useful in organizing processes and the functions they perform into one or more predetermined domain categories. Based upon this division, processes in the different domains may be scheduled to execute in parallel on multiple processors if they do not share the same data. However, processes within each domain that share data and data structures are limited to serialized execution on a single processor to avoid data contention or corruption.

Power optimized scheduler 108 schedules processes according to their assigned domain allowing for MP parallel execution without the overhead associated with explicit locks. For example, storage server 124 and operating system 136 may implement CSMP using the following set of domains: network (N), RAID (R), storage (S), filesystem (F), idle (I), and exempt (K). As implied by their names, the network domain includes processes related to performing network specific functions. RAID domain includes processes dealing with implementing the RAID functions and different levels of RAID (e.g, RAID-0 through RAID-5). Storage domain includes processes directly related to operating the storage devices, such as disks. Filesystem is a domain that contains filesystem related functions as well as a number of other functions not readily assigned to the other domains. The idle domain is that domain where the processor executes an idle function awaiting completion of some input-output or other event. Exempt domain includes those processes inherently MP safe because they only operate on their input data and have no global sharing of state and data. For example, exempt processes may perform compression, decompression, or RAID XOR computations without sharing data. Aside from the idle and exempt domains, power optimized scheduler 108 of the present invention may serialize execution of processes within a domain allowing only one process in each domain to execute on one processor. In comparison, processes in different domains generally have different functionality and do not operate on the same data thereby allowing them to execute in parallel without conflict.

Power optimized scheduler 108 categorizes processes into each domain as necessary to fulfill the client request 138. Separating processes into the proper domains enables power optimized scheduler 108 to facilitate safe execution of these processes in MP environment without locks or other additional exclusionary mechanisms used in fine grained symmetric multiprocessing (SMP). As described later herein, there may occasionally be some tasks in different domains that still cannot be executed in parallel. Domain combinations not allowed to execute processes in parallel are entered in a domain exclusion matrix 114 in accordance with aspects of the present invention. For example, power optimized scheduler 108 may serialize execution between two different domains if there is a probability that processes in these two different domains may access the same data.

Power optimized scheduler 108 also functions to determine an optimal use of processors in storage system 106 provided a given workload of instructions. In accordance with aspects of the present invention, the power optimized scheduler 108 schedules execution of tasks on the fewest number of processors. Packing the tasks on fewer processors is not only more efficient but can also lead to reduced overall power consumption requirements. For example, scheduling performed in accordance with the present invention makes it possible to plan for the temporary shutdown of unused processors or cores in advance since they will not be used to execute tasks in a given time interval.

Power optimized scheduler 108 may actually shutdown certain processors in storage system 106 to save energy and reduce heat output. Executing tasks on fewer processors further increases performance as the overhead in sharing among fewer processors is reduced and cache affinity improved. For example, there is an increased likelihood that the data already stored in cache will be reused by another processor when fewer processors are running and they share a common cache. As the workload changes, aspects of the present invention may reevaluate the processor utilization and then place previously shutdown or unused processors back online. For example, power optimized scheduler 108 may bring online any previously shutdown processors to meet an increased processor utilization demand.

Aspects of the present invention may also be advantageous in a virtualized computational environment using MP and virtual machines. Before a processor is shut down, some implementations may instead assign unused processor capacity from one virtual machine in an idle state to another virtual machine in need of additional computational power. Virtualized computing allows implementations of the present invention an additional option of distributing computing capacity to other virtual machines before actually taking processors offline and shutting them down.

Figure 2:
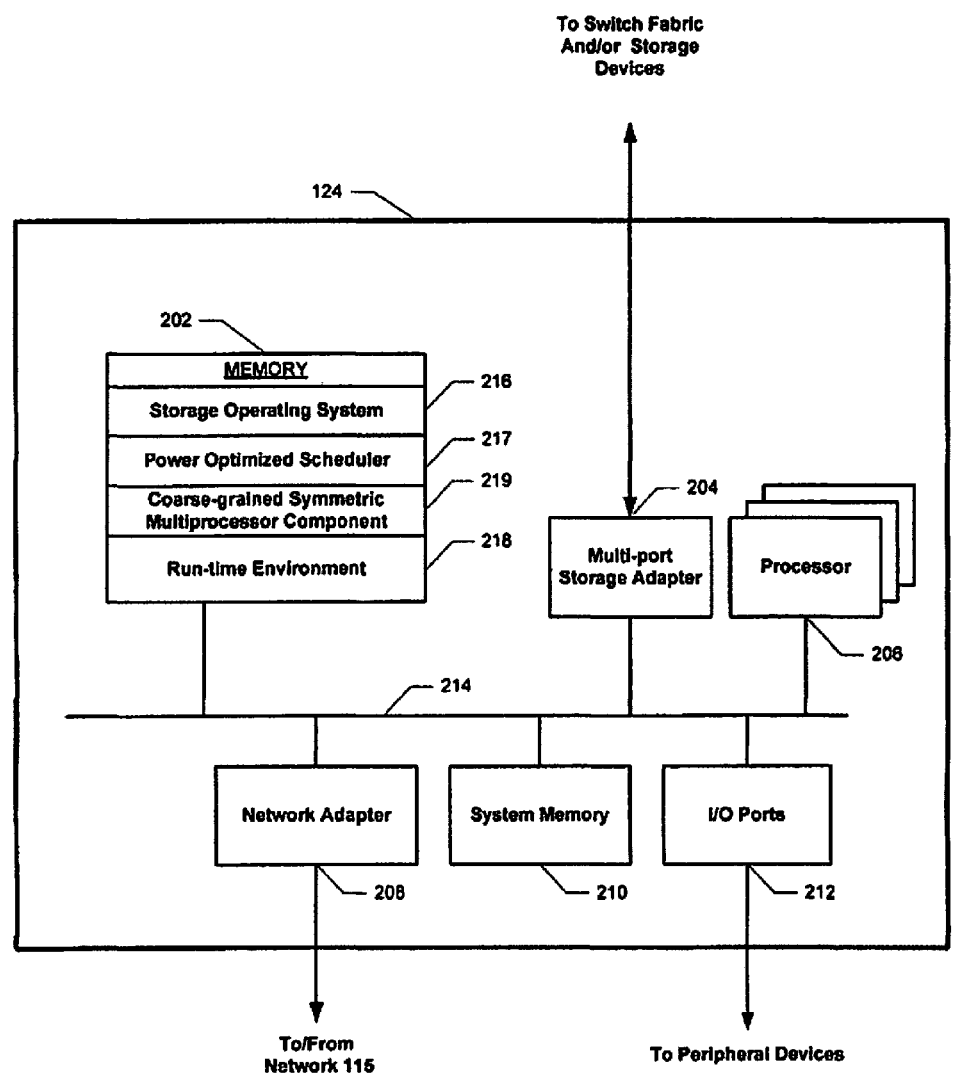
FIG. 2 is a schematic block diagram of storage system that may be advantageously used with one implementation of the present invention.

FIG. 2 is a schematic block diagram of storage server 124 that may be advantageously used with one implementation of the present invention. Storage server 124 includes a memory 202, a multi-port storage adapter 204, a processor complex 206, a network adapter 208, an system memory 210 and I/O ports 212 capable of communicating over interconnect 214. It is contemplated that aspects of the invention described herein may apply to any type of special-purpose computer (e.g., file serving appliance) or general-purpose computer, including a standalone computer, embodied as a storage system. To that end, storage server 124 may be broadly, and alternatively, referred to as a component of the storage system 106. Moreover, various aspects of the invention can be adapted to a variety of storage system architectures including, but not limited to, a network-attached storage (NAS) environment, a storage area network (SAN) and disk assembly directly-attached to a client/host computer. The term "storage system" should, therefore, be taken broadly to include such arrangements and combinations thereof.

In the illustrative implementation in FIG. 2, memory 202 includes storage locations that are addressable by the processor and adapters for storing software program code and data. For example, memory 202 may include a form of random access memory (RAM) that is generally cleared by a power cycle or other reboot operation and classified as "volatile" memory. Processor complex 206 and various adapters may, in turn, comprise processing elements and logic circuitry configured to execute the software code and manipulate the data stored in the memory 202.

Memory 202 includes storage operating system 216 portions of which is typically resident in memory and executed by the processing elements. Storage operating system 216 functionally organizes storage server 124 by, inter alia, invoking storage operations in support of a storage service implemented by storage server 124. As previously described, the term "storage operating system" as used herein with respect to a storage server generally refers to the computer-executable code operable on a storage system that implements file system semantics (such as the above-referenced WAFL™) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

It is also contemplated that storage operating system 216 may execute within a run-time environment 218 that may include a general purpose operating system or virtualization environments that help improve utilization and efficient allocation of hardware and computing resources on storage server 124. It will be apparent to those skilled in the art that other processing and memory areas, including various computer readable media, may be used for storing and executing program instructions pertaining to the inventive techniques described herein.

Power optimized scheduler 217 includes functions and datasets necessary for implementing aspects of the present invention. This power optimized scheduler 217 works within the MP environment to optimally reduce the number of processors required to execute various computational functions within the MP environment. As the workload requirements change over time, power optimized scheduler 217 dynamically shutdowns certain unused processors in processor complex 206 to save additional energy and reduce heat output. Optimized advanced scheduling of tasks on fewer processors allows the unscheduled processors to be shutdown without impacting performance.

Instead of actually shutting down processors, it may also possible for power optimized scheduler 217 to assign unused processor capacity to other virtual machines in a virtualized computing environment. For example, a processor from processor complex 206 on a first storage server may be shared with a virtual machine running on a second storage server. In the event there is no expected or actual demand from other virtual machines then the unused processors in processor complex 206 would be shutdown in accordance with implementations of the present invention.

It is also contemplated that power optimized scheduler 217 may also add necessary processors to the schedule as needed to accommodate an increased computing demand. Coarse-grained symmetric multiprocessor (CSMP) component 219 receives the schedule for executing certain processes within one or several domains from power optimized scheduler 217. The schedule may cause one or more processors from processor complex 206 to go online and ready for execution. While they are illustrated as discrete elements, it is also contemplated that power optimized scheduler 217, CSMP component 219 and run-time environment 218 could be integrated into storage operating system 216 as appropriate to the particular implementation.

Multi-port storage adapter 204 cooperates with the storage operating system 216 and optionally run-time environment 218 executing on storage server 124 to access information requested by the one or more clients. Resulting information may be stored on or retrieved from the storage devices that are attached to the storage server 124 or other nodes of a storage system via the multi-port storage adapter 204. The multi-port storage adapter 204 includes input/output (I/O) interface circuitry that couples to the storage devices over an I/O interconnect arrangement, such as a conventional high-performance, Fibre Channel serial link topology. One or more interconnects on the multi-port storage adapter 204 may be used to provide higher throughput and/or reliability. The information is retrieved by the multi-port storage adapter 204 and, if necessary, processed by the processor complex 206 or processors on the multi-port storage adapter 204 (not shown) prior to being forwarded over interconnect 214 to the network adapter 208, where the information is formatted into one or more packets and returned to a requesting client.

In one implementation, storage devices are arranged into a plurality of volumes, each having a file system associated therewith. These storage devices may include conventional magnetic tapes or disks, optical disks such as CD-ROM, DVD, magneto-optical (MO) storage or any other type of non-volatile storage devices suitable for storing large quantities of data.

Each volume may include one or more disks. Implementations of the present invention can configure the physical disks of storage devices into RAID groups so that some disks store striped data and at least one disk stores separate parity for the data, in accordance with a preferred RAID 4 configuration. However, other configurations (e.g. RAID 5 having distributed parity across stripes, RAID 0 mirroring and others) are also contemplated. In a typical implementation, a volume may be implemented as multiple RAID groups.

Processor complex 206 represents the one or more computational units available in storage server 124 that contribute to the overall MP environment. It is contemplated that processor complex 206 may be a physical aggregation of multiple individual processors that each individually process and transfer data over interconnect 214. Alternate implementations of processor complex 206 may be a single processor having multiple on-chip cores that may partition and share certain resources also on the processor die such as L1/L2 cache. For at least these reasons, aspects of the present invention may be described as using a processor or multiple processors for convenience however it is contemplated that the term "processor" could also be applied to designs utilizing one core or multiple cores found on a single chip or die. Likewise, the term process is used to describe the act of executing a set of related instructions on one or several processors but it is also contemplated that alternate implementations could be performed using single or multiple threads executing the same or similar instructions on one or several processors each capable of multi-threaded execution.

The network adapter 208 comprises the mechanical, electrical and signaling circuitry needed to connect the storage server 124 to clients 102 and 104 over network 115, which may include a point-to-point connection or a shared medium, such as a LAN.

In one implementation, the system memory 210 provides fault-tolerant backup of data, enabling the integrity of host transactions to survive a service interruption based upon a power failure, or other fault. The size of the system memory 210 is variable, although it is typically sized sufficiently to log a certain time-based chunk of transactions (for example, several seconds worth). In one implementation used in a storage system, system memory 210 is non-volatile random-access memory (NVRAM) capable of storing client requests corresponding to discrete client messages requesting file transactions such as "WRITE," "CREATE," "OPEN," and the like. Further, these entries may be logged in the NVRAM, e.g., according to the particular order they are completed. The use of the NVRAM for system backup and crash recovery operations is generally described in commonly assigned application Ser. No. 09/898,894, entitled "System and Method for Parallelized Replay of an NVRAM Log in a Storage Appliance" by Steven S. Watanabe et al. assigned to the assignee of the present invention and expressly incorporated herein by reference.

I/O ports 212 may be connected to a variety of display devices, keyboards, mouse and other devices to interact with storage server 124 and the processes being run thereupon. A CD-ROM, DVD or other non-volatile storage device along with a respective CD-ROM, DVD or other storage media can also be connected via I/O ports 212 to storage server 124. These storage media may contain one or more implementations of the present invention tangibly embodied on the storage media with instructions capable of being executed on the processor complex 206.

Figure 3:
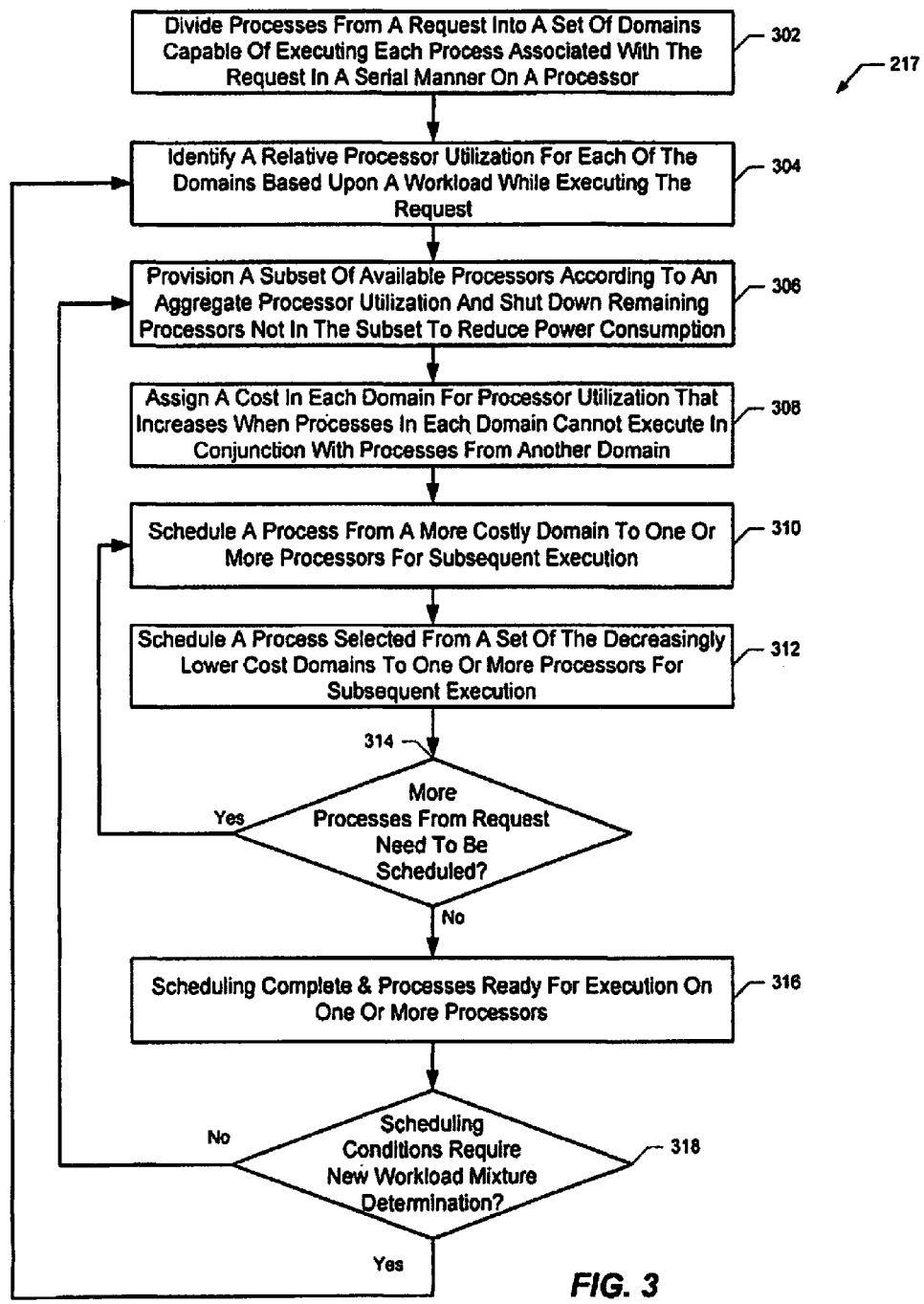
FIG. 3 is a flowchart diagram providing the operations of a power optimized scheduler in accordance with one implementation of the present invention.

Referring to FIG. 3, a flowchart diagram provides the operations of power optimized scheduler 217 (hereinafter "scheduler") in accordance with one implementation of the present invention. Initially, the scheduler divides the processes from a request into a set of domains capable of executing each process associated with the request in a serial manner on a processor (302). In one implementation, the request from a client may be to read from or write data to a storage server.

Processes for this task may be divided into one or more domains described as: network, filesystem, RAID, storage, idle and exempt. Alternate implementation may use other domains separated by different functional boundaries depending on the overall system purpose and the underlying processes used to facilitate the request. For example, one implementation may use 5 different domains while other implementations may use as many as 10 or more domains. Alternate implementation of the present invention may use fewer than 5 domains to describe the functional boundaries of the system. In general, these different domains may be represented by an array D[N] where N represents the number of CSMP domains available to the scheduler.

Once the processes have been divided according to their respective domains, the scheduler identifies a relative processor utilization for each of the domains based upon a workload while executing the request. (304) The relative processor utilization reflects that certain domains may or may not use as much processor capacity as others when fulfilling a particular request. Factors for determining relative processor utilization may include whether a domain is MP safe and if so the number of processes within the domain capable of executing in parallel. In accordance with the present invention, domains should be given greater or lesser amount of resources from the scheduler according to their utilization. In one implementation, the scheduler turns on all the available processors in an MP system for a predetermined period of time and then measures how the workload from the processes is distributed over the domains in D[N]. For example, the scheduler may turn on all 8 cores in an 8-way MP system for a predetermined time interval of one-second (i.e., 1 sec.) and then measure the relative processor utilization from each of the domains in D[N].

If the measured use from one domain during this time interval does not exceed the computational capacity of a single processor then the relative processor utilization associated with the domain is equal or less than 100%. For example, the network domain may be assigned 35% relative processor utilization if the network domain required only 35% processor relative processor utilization during the time interval. However, a storage domain might be assigned 250% relative processor utilization if it required the processing capability of 2½ processors during the same time interval.

The scheduler may determine relative processor utilization by analyzing entries in an execution log file. MP-safe domains may be assigned more than 100% processor capacity when they can execute processes within the MP-safe domain in parallel on multiple processors. For example, a domain capable of using the maximum number of processors in an 8-way MP system may be assigned a relative processor utilization of as much as 800%. Other domains that are not considered MP safe cannot execute their tasks and instructions in parallel and therefore limited to no more than 100% processor capacity or a single processor at a time. For example, the filesystem domain may be one domain not considered MP safe since multiple processes may share data in the filesystem domain. An array M[N] stores the maximum processor capacity that each domain is capable of potentially using in a given MP system.

In one implementation, the relative processor utilization determination reflects the execution frequency of certain domains while responding to a request. For example, the execution log associated with performing a "cache read" request may indicate the load mixture: network 50%, filesystem 60%, RAID 0% and storage 0%. This mixture reflects the fact that a "cache read" would come directly from cache and therefore not need execute RAID instructions or storage instructions. Network 50% and filesystems 50% indicates that both the network domain and filesystem domain activity during the measured time interval each occupied approximately 50% of the capacity of a single processor. An array U[N] may be used to represent the relative processor utilizations distributed over each of N domains provided a particular workload.

Next, the scheduler provisions a subset of available processors according to aggregate processor utilization and shuts down the remaining processors not in the subset to reduce power consumption. (306) Implementations of the present invention combines the utilization from each domain into an aggregate utilization to determine an overall requirement for resources. For example, a relative processor utilization of network 50%, filesystem 250%, RAID 80%, storage 60% and exempt 80% may result in an aggregate utilization of 50%+250%+80%+60%+80% or 520%. This aggregate utilization determines that a subset of 7 processors out of a total of 8 processors should be powered on and 1 processor shutdown. It is contemplated that the scheduler would need only 6 processors to meet the aggregate processor utilization demand and the remaining 2 processors would either sit idle or temporarily be shutdown. The additional 7th processor is included in the subset with the expectation and remains idle but available just in case there is an sudden increase in the demand. In general, Ksub represents a subset of processors from K processors available in a system such that Ksub is less than or equal to K. If an aggregate processor utilization is defined as AU then the projected Ksub in one implementation may be determined as follows:

$$K_{sub} = \text{round\_up}(AU) + 1$$

$$K_{shutdown} = K - K_{sub}$$

Where:

AU is Aggregate relative processor utilization across all domains.

round_up(x) is a function that rounds up to the nearest integer value.

K represents all the available processors in a system.

$K_{sub}$, is a subset of processors turned on and always equal to or less than K.

$K_{shutdown}$ is a set of processors that are instructed to be shutdown.

+1 accommodates an additional processor in case of an unexpected surge in processing requirements during a time interval.

The scheduler assigns a cost for relative processor utilization in each domain that increases when one domain cannot execute in conjunction with another domain. (308) Initially, the base cost assigned to each domain is generally higher for domains with a higher utilization. For example, a network domain having a 90% utilization would be given a higher base cost compared to storage domain having a 80% utilization since the former demands more processor capacity during execution. Base costs may be increased when it is determined that a selected domain cannot execute in parallel with another process from the same or different domain. This increased cost accommodates for the added limitations in scheduling these processes. For example, this might occur when two domains share data and processes in each domain may modify this data. Accordingly, the increased cost takes in account the added overhead associated with ensuring the processes in the respective domains can be scheduled and produce reliable results. The cost function C[x] assigns a cost to each domain for purposes of scheduling and execution in accordance with implementations of the present invention. One cost function C[x] is described in further detail later herein in accordance with aspects of the present invention.

In one implementation of the present invention, an exclusionary matrix E[x][y] indicates whether one domain should not be scheduled for execution in conjunction with another domain. The overall cost of a selected domain takes in account the number of entries in the exclusionary matrix E[x][y] that disallows scheduling of the selected domain with all other domains. Below is an example exclusionary matrix in accordance with one implementation using a combination of the following four domains: filesystem (F), exempt (E), RAID (R) and storage (S).

|   | F | E | R | S |   |
|---|---|---|---|---|---|
| F | 1 | 0 | 0 | 0 |   |
| E | 0 | 0 | 0 | 0 | = E[x][y] |
| R | 0 | 0 | 1 | 0 |   |
| S | 0 | 0 | 0 | 0 |   |

Where:

E[x][y] is an exclusion matrix for one implementation indicating allowable parallel execution of processes in the identified domains x and y.

An entry of '1' indicates that processes from the two domains should not be executed in parallel on the same or different processors.

An entry of '0' indicates that processes from the two domains may be executed in parallel on the same or different processors.

F represents the filesystem domain which is not MP safe and therefore cannot run in parallel with other filesystem or storage domain processes.

E represents the exempt domain and may be scheduled and executed in parallel with processes from any another other domain including the exempt domain.

R represents the RAID domain and may be scheduled and executed in parallel with processes from any another other domain other than the RAID domain itself.

S is the storage domain and may be scheduled and executed in parallel with processes from any other domain except the filesystem domain as these two domains may share the same data.

The scheduler references the exclusionary matrix E[x][y] to determine the overall added costs to be added to a selected domain 'x'. Each entry in the exclusionary matrix E[x][y] for a selected domain may result in an increased 'cost' due to a conflict with one or more other domains. For example, the filesystem domain (F) (e.g. x=F) in the exclusionary matrix conflicts with 2 domains: the filesystem domain (F) and the storage domain. Notwithstanding other factors, the filesystem domain (F) in this example is attributed a higher 'cost' than the exempt domain (E) since the exempt domain has no entries in the exclusionary matrix E[x][y] indicating conflict.

The scheduler then uses the 'cost' associated with each domain to prioritize and schedule execution of the processes on the one or more processors. In one implementation, the scheduler begins by scheduling processes from a more costly domain to one or more processors. (308) The process from the more costly domain is given priority over the processes from other domains as it may require more processor resources and may limit the degree of parallel processing. Executing the more costly processes first allows the remaining less costly processes to be scheduled more freely and with a reduced likelihood of conflict. For example, processes from a filesystem domain may have the highest 'cost' and therefore will be scheduled first for execution. Even in an MP system, instructions from the filesystem domain in this example may only execute on a single processors since the filesystem domain cannot run in parallel with itself.

Next, the scheduler schedules processes from each of the decreasingly lower cost domains to one or more processors for subsequent execution. (312) The scheduler proceeds to schedule processes in the decreasingly lower cost domains while maintaining the ratio of relative processor utilization from the domains as indicated in U[N]. For example, the execution of processes from the network domain at 50% utilization needs to be balanced with a execution of processes from the storage domain set to 60%.

Given multiple processes in each domain, one implementation of the present invention may schedule a portion of these processes from each domain in a round-robin format. For example, the scheduler may schedule 1% of the processes in each of the domains starting with the highest cost domain on down to the lowest cost domain. This is repeated until the processes in each of the domains have been scheduled and awaiting execution. Alternatively, it is also be possible for the scheduler to schedule a larger percentage from each domain and is not limited to scheduling only 1% of the processes in each domain in a round-robin format. Indeed, it is contemplated that yet another implementation of the present invention may attempt to schedule all the processes in the higher cost domains before attempting to even schedule those processes in the lower cost domain.

The, scheduler continues to schedule processes from the more costly domain (310) and lower cost domains in decreasing order (312) until there are no more processes from the request that need scheduling. (314—No) Once all processes from the domains are scheduled, aspects of the present invention indicate that the schedule is complete and processes should be executed on one or more processors. (316) As a further refinement, the scheduler may attempt to sort as many processes and/or instructions as possible from a domain onto a single processor after an initial schedule is established. This will increase the cache affinity of instructions on these processors as there may be shared data in cache between instructions of the same domain. For example, instructions from domains S E E E at time T1 may be scheduled to execute on processors P1, P2, P3 and P4. At time T2 an additional set of instruction from domains E E E S may initially be scheduled. This further refinement would further modify the schedule at time T2 to schedule the instructions on processors P1, P2, P3 and P4 from domains S E E E to keep the domains on the same processors. Keeping certain domains executing instructions on the same processor increases cache affinity or the likelihood of cache hits on each respective processor.

If there are remaining processes (318), the scheduler may also need to evaluate whether the workload has changed. For example, the scheduler may determine that the workload mixture needs to be recalculated (318—Yes) as some period of time has elapsed or there is some other trigger requiring that the workload mixture be reconsidered. Alternatively, if sufficient time has not passed or for other reasons then the workload mixture has not changed and the existing workload mixture is not modified. (318—No) The scheduling process continues until all processes have been scheduled on one or more processors in the MP system.

Figure 4:
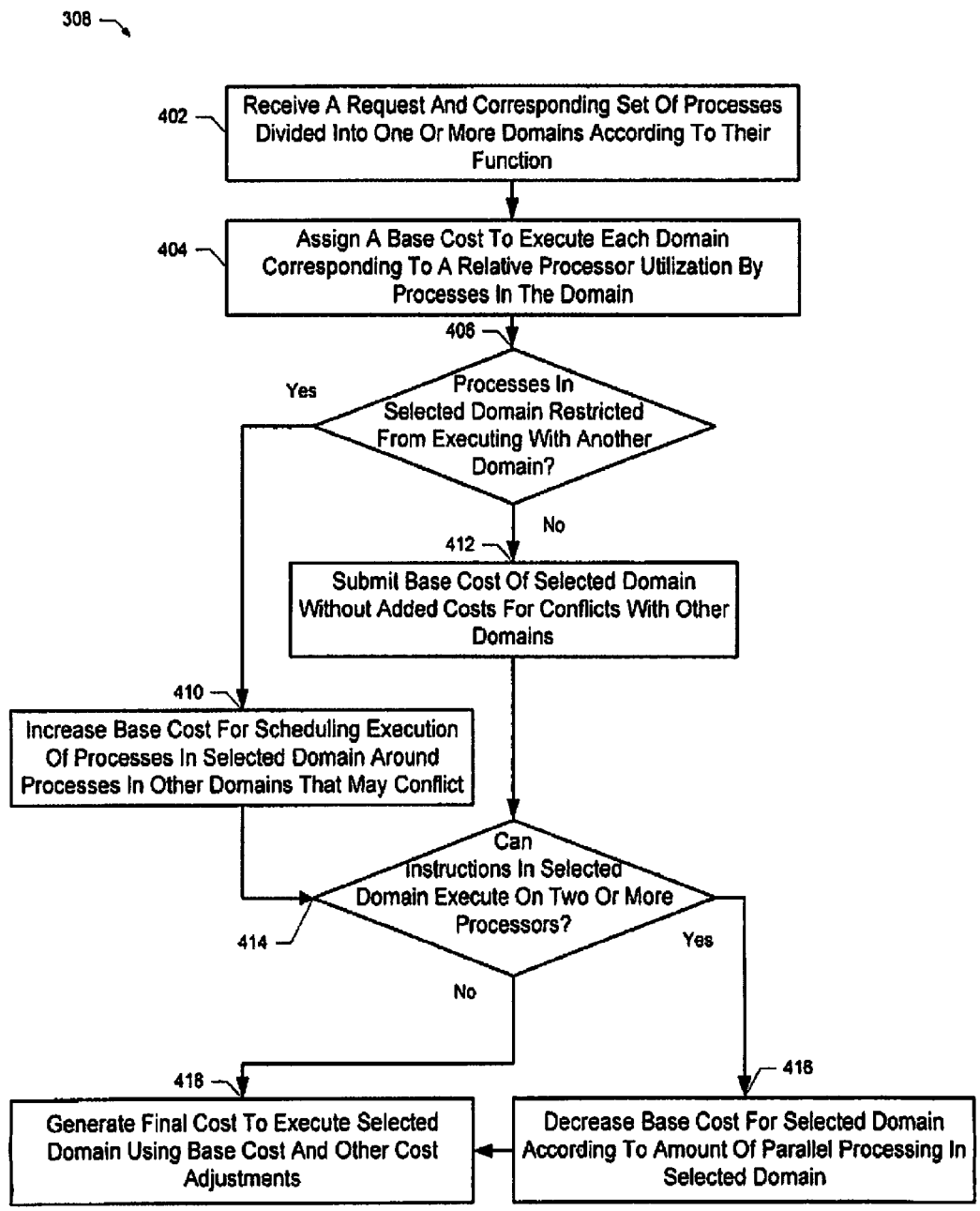
FIG. 4 is a flowchart diagram of the operations for generating a cost function for executing domains in accordance with one implementation of the present invention.

FIG. 4 is a flowchart diagram of the operations for calculating the 'cost' associated with a domain when prioritizing and scheduling associated processes for execution. As previously described, a base cost is assigned to each domain and then increased commensurate with the likelihood that execution of processes in the selected domain may conflict with processes from other domains. Aspects of the invention use the results of this cost function to optimally schedule and execute processes from different domains on a reduced number of processors. Processors not scheduled to execute a process are shut down to reduce energy costs and heat output in accordance with aspects of the present invention.

As a preliminary step, the power optimized scheduler receives a request and corresponding set of processes divided into one or more domains according to their function. (402) In this context, the domain is a grouping of processes with a related functionality and each domain is generally assigned to at least one processor. If processes in one domain may potentially share data with and instructions within the same domain then the tasks and instructions are executed in serial manner. Serializing execution of processes that share data within each domain prevents two processes from operating on the same data simultaneously. However, multiple processes from a single domain may be executed in parallel in a MP environment if the domain is deemed MP safe. For example, in one implementation processes from the MP safe storage domain (S) can be executed in parallel on multiple processors and need not be limited to serialized execution on a single processor.

The scheduler assigns an initial base cost to execute each domain corresponding to a relative processor utilization in each domain, (404) As previously described, a higher cost is assigned to the domains that have a higher relative processor utilization requirement. For example, a network domain having a 90% relative processor utilization will have a higher cost than a storage domain having only a 80% relative processor utilization.

Next, the scheduler references the exclusion matrix to determine if processes from a selected domain are restricted from executing with processes from another domain. (406) In some cases, there are no conflicts between processes of the selected domain and any other domain in the exclusion matrix. (406—No) For example, the exempt domain in the previously described exclusion matrix does not share data or have any other conflict with another domain and therefore can run in parallel with other domains on any available processor. Accordingly, if there is no conflict then the scheduler submits the base cost of the selected domain without added costs for scheduling processes around conflicts with processes from other domains. (412)

Alternatively, if there are conflicts between processes in the selected domain and any other domains (406—Yes) then there is an increase in the base cost for the selected domain. The cost function increases the cost associated with scheduling execution of processes in the selected domain with the other domains. (410) For example, the filesystem domain in the previously described exclusion matrix may have increased costs due to conflicts with the storage domain and the filesystem domain itself. In one implementation, processes in the filesystem domain cannot execute in parallel on multiple processors and cannot run at the same time as processes classified in the storage domain.

The cost assigned to a selected domain may be reduced depending on whether processes from the selected domain may run on two or more processors in parallel. (414—Yes) In accordance with the present invention, the ability to execute on multiple processors in parallel decreases both the base cost and increased costs in the cost function of the present invention. For example, a greater the degree of parallel execution decreases the overall cost to execute as the scheduler has more flexibility in scheduling the process for execution on a wider range of processors and during more time intervals. Accordingly, the cost function decreases the base cost and other cost adjustments for the selected domain in accordance with the amount of parallel processing in the selected domain. (416) For example, processes classified in the exempt domain may run on multiple processors in parallel and therefore will have a correspondingly reduced overall cost due to this factor.

If the selected domain cannot run on multiple processors (414—No) then the final cost includes the base cost and increased costs without reduction. (418) The cost for scheduling and executing these processes does not change as the processes in this domain are serialized and cannot run on multiple processors. For example, processes associated with the filesystem domain in the example exclusion matrix do not have a reduced cost as they may only run on a single processor.

In one implementation, the cost function used for scheduling instructions in accordance with implementations of the present invention may be represented by the formula appearing below.

$$C[x] = U[x]/M[x] + \Sigma_{i=1}^{N}[(U[x] \times U[i] \times E[x][i])/(M[x] \times M[i])]$$

where:

U[ ]: is the relative processor utilization matrix for each domain

M[ ]: is the maximum processor utilization matrix for each domain

E[ ]: is the two-dimensional exclusion matrix for executing processes in parallel from a pair of domains C[ ]: is the overall 'cost' function taking in account base cost, increased costs and reduction in cost due to executing processes from a selected domain on multiple processors in parallel x: is an index for the selected domain of interest N: is the number of domains used in the scheduling method In the above example, it is useful to highlight a few of the many factors that influence the cost function used for a given domain. It can be appreciated that the overall cost function C[x] in this example depends on a two different terms: (1) a processor utilization term that depends on U[x] N for a given domain x and (2) a conflict term that depends on entries in an exclusion matrix E[ ][ ]. For example, a selected domain x having a very high processor utilization U[x] will have a correspondingly higher base cost C[x]. This base cost will not be increased if there are no entries in the exclusion matrix E[ ][ ] indicating a conflict with one or more of the other domains 1 through N. However, if there is at least one conflict with another domain from 1 through N then the cost function C[x] for the domain x will increase in proportion to the utilization U[x] for the selected domain x and the utilization U[i] for the domain in conflict. With respect to parallel processing, it can also be appreciated that the cost function C[x] for a domain x decreases if the maximum processor utilization M[ ] for the domain x or i can be scheduled and executed on multiple processors in parallel.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Multiprocessor or MP may include multiple individual processors coupled together communicating over an off-chip high-speed bus as well as more tightly coupled arrangements. For example, a multicore processor may also be considered MP as it is able to handle multiple independent instruction streams and communicates using at least some on-die connections between cores located on the same die. Accordingly, it should be appreciated aspects of the present invention applies not only to processors and multiple processors but also to single core and multicore computer processor implementations.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific implementations have been described herein for purposes of illustration, various modifications may be made without departing from the spirit and scope of the invention. Accordingly, the invention is not limited to the above-described implementations, but instead is defined by the appended claims in light of their full scope of equivalents. For example, an example set of domains is provided that include filesystem, network, storage, RAID, Exempt and idle but it is contemplated that many other combination of domains may be created for scheduling tasks and execution of processes. Likewise, the Exclusion matrix also referenced filesystem, network, storage, RAID however it is contemplated that the Exclusion matrix E[ ] [ ] may be constructed from any combination of domains appropriate for the particular implementation. Furthermore, an example cost function C[ ] is provided as an example however aspects of the present invention may include this cost function C[ ] as well as many other cost functions consistent with the teachings and suggestions of the present invention. This description of the invention should be understood to include all novel and non-obvious combinations of elements described herein, and claims may be presented in this or a later application to any novel and non-obvious combination of these elements. The foregoing implementations are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of scheduling processes, comprising:

dividing at a scheduler computing device processes from a received request into a set of domains where processes in the same domain are executable in a serial manner on at least one of a plurality of processors without conflict;

identifying at the scheduler computing device a relative processor utilization for each domain from the set of the domains for the request based upon a workload corresponding to a prior execution of a corresponding request;

provisioning at the scheduler computing device a subset of the plurality of processors to fulfill an aggregate processor utilization based on the identified relative processor utilization for each domain from the set of domains; and shutting down at the scheduler computing device any remaining processors from plurality of processors not provisioned in the subset of available processors.

2. The method of claim 1 further comprising:
bringing online at the scheduler computing device any processors from the plurality of processors that have been provisioned in the subset of available processors but previously shutdown to reduce power consumption.

3. The method of claim 1 further comprising:
assigning at the scheduler computing device a base cost to each domain corresponding to the relative processor utilization for each domain; and
scheduling at the scheduler computing device the processes from each domain to the subset of available processors for subsequent execution based on the base cost assigned to each domain.

4. The method of claim 1 wherein the request concerns operations to be performed on a storage system having a multiple core processor with at least two processor cores.

5. The method of claim 1 wherein the processes can be executed on the plurality of processors without the use of fine-grained locking mechanisms.

6. The method of claim 3 wherein the relative processor utilization for each domain is determined by analyzing entries in a log created while executing a workload associated with the corresponding request.

7. The method of claim 1 wherein the relative processor utilization for each domain is recalculated after a predetermined period of time has passed to reflect a change in the workload with respect to the request.

8. The method of claim 3 wherein assigning the cost further comprises:
receiving at the scheduler computing device the request and corresponding set of processes divided into one or more domains according to a function associated with each process;
assigning at the scheduler computing device the base cost to execute each domain corresponding to a relative processor utilization from the one or more processes in each domain;
increasing at the scheduler computing device the base cost to execute each domain when execution of at least one process in each domain may conflict with execution of at least one process in another domain; and
reducing at the scheduler computing device the base cost for each domain according to an amount of parallel processing possible on two or more processors in each domain.

9. The method of claim 7 wherein an exclusion matrix indicates whether a process in one domain may have a conflict executing in conjunction with a process in another domain.

10. A scheduling apparatus, comprising:
a processor that executes instructions;
a memory containing instructions when executed on the processor that cause the apparatus to,
divide processes from a received request into a set of domains where processes in the same domain are executable in a serial manner on at least one of a plurality of processor without conflict;
identify a relative processor utilization for each domain from the set of the domains for the request based upon a workload corresponding to a prior execution of a corresponding request;
provision a subset of the plurality of processors to fulfill an aggregate processor utilization based on the identified relative processor utilization for each domain from the set of domains; and
shut down any remaining processors from the plurality of processors not provisioned in the subset of available processors.

11. The apparatus of claim 10 further comprising instructions when executed on the processor that,
bring online any processors from the one or more processors that have been provisioned in the subset of available processors but previously shutdown to reduce power consumption.

12. The apparatus of claim 10 further comprising instructions when executed on the processor that,
assign a base cost in each domain corresponding to a relative processor utilization in each domain that increases when at least one process in a selected domain cannot execute in conjunction with processes from another domain due to conflicts,
schedule at least one process from a more costly domain to one or more processors for subsequent execution and
schedule at least one process selected from a set of lower cost domains to one or more processors for execution that will be subsequent to the at least one process from the more costly domain.

13. The apparatus of claim 10 wherein the request concerns operations to be performed on a storage system having a multiple core processor with at least two processor cores.

14. The apparatus of claim 10 wherein the processes can be executed on the plurality of processors without the use of fine-grained locking mechanisms.

15. The apparatus of claim 12 wherein the relative processor utilization for each domain is determined by analyzing entries in a log created while executing a workload associated with the corresponding request.

16. The apparatus of claim 10 wherein the relative processor utilization for each domain is recalculated after a predetermined period of time has passed to reflect a change in the workload with respect to the request.

17. The apparatus of claim 12 wherein assigning the cost further comprises instructions when executed that cause the processor to,
receive the request and corresponding set of processes divided into one or more domains according to a function associated with each process,
assign the base cost to execute each domain corresponding to a relative processor utilization from the one or more processes in each domain,
increase the base cost to execute each domain when execution of at least one process in each domain may conflict with execution of at least one process in another domain, and
reduce the base cost for each domain according to an amount of parallel processing possible on two or more processors in each domain.

18. The apparatus of claim 16 wherein an exclusion matrix indicates whether a process in one domain may have a conflict executing in conjunction with a process in another domain.

* * * * *